Patented Aug. 1, 1939

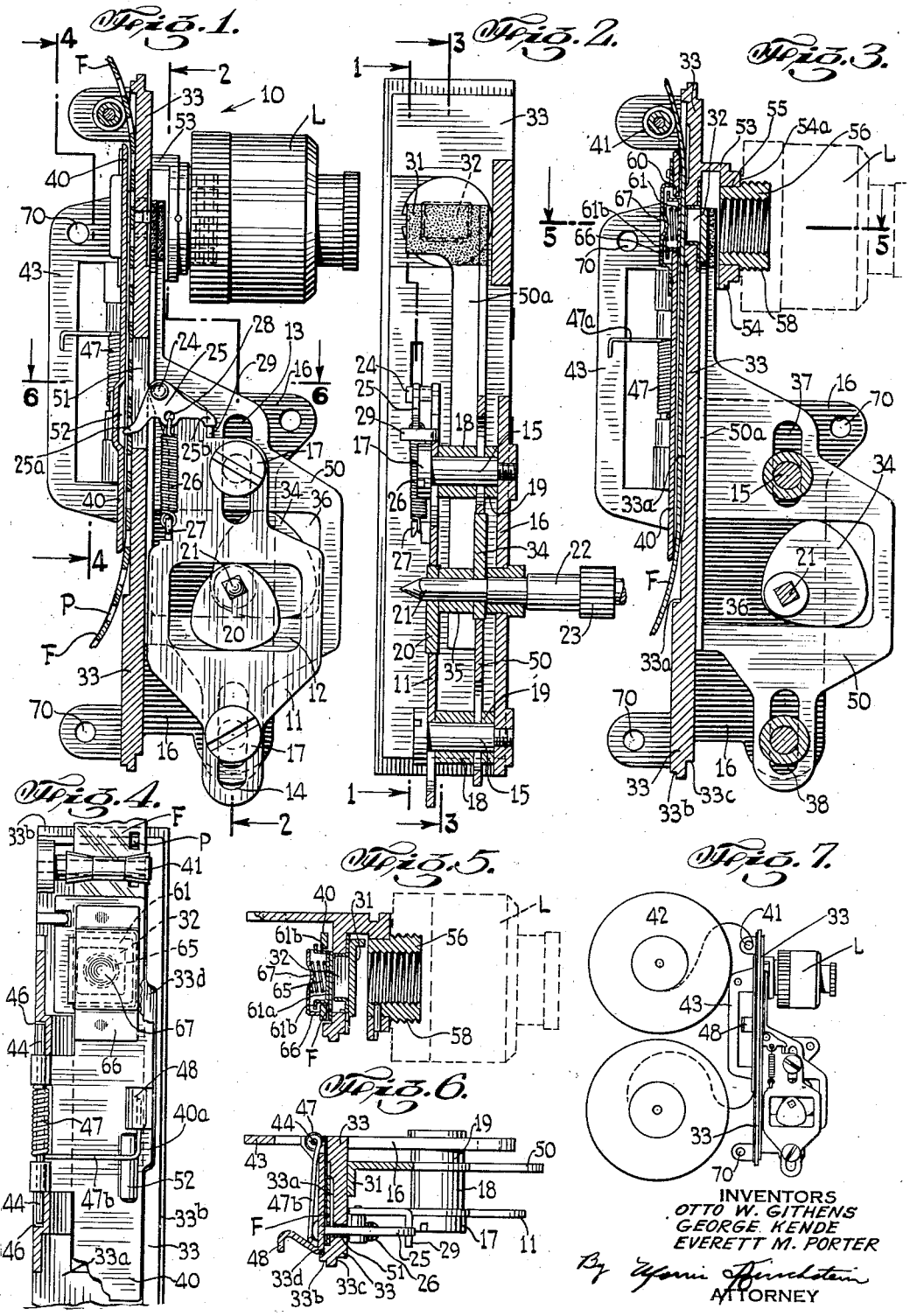

2,167,713

UNITED STATES PATENT OFFICE 2,167,713

INTERMITTENT FILM FEED AND SHUTTER MECHANISM

Otto W. Githens and George Kende, New York, and Everett M. Porter, Brooklyn, N. Y., assignors, by mesne assignments, to Universal Camera Corporation, New York, N. Y., a corporation of Delaware Application January 21, 1937, Serial No. 121,488

9 Claims. (Cl. 88—18.4)

This invention relates to motion picture apparatus. More particularly, it relates to intermittent film moving, and shutter actuating mechanisms.

One of the objects of our invention is to provide a highly improved camera mechanism construction of the character described in which the timing relationship between the intermittent film moving mechanism and the shutter operating mechanism will always be constant.

Another object of our invention is to provide a camera mechanism construction of the character described which shall comprise relatively few and simple parts, which shall be relatively inexpensive to manufacture, easy to assemble, which shall be sturdy and compact and at the same time operate with a high degree of efficiency.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Certain features described but not claimed in this application are described and claimed in a co-pending application, Serial No. 70,188, filed March 23, 1936 for Motion picture apparatus.

In the accompanying drawing, in which is shown one of the various possible embodiments of this invention, Fig. 1 is a plan view, partly sectional, of a portion of a motion picture camera embodying my invention;

Fig. 2 is a sectional view taken substantially on the line 2—2 of Fig. 1;

Fig. 3 is a sectional view taken substantially on the line 3—3 of Fig. 2;

Fig. 4 is an enlarged section taken substantially on the line 4—4 of Fig. 1;

Fig. 5 is a sectional view taken substantially on the line 5—5 of Fig. 3;

Fig. 6 is a cross-sectional view taken substantially on the line 6—6 of Fig. 1; and Fig. 7 is a diagrammatic view of reduced size illustrating the path of travel of the film in relation to the film guide.

Referring now in detail to the drawing, there is disclosed a portion of the apparatus of a motion picture camera embodying our invention which may be constructed as an integral unit 10, so that it can be easily and quickly assembled outside of the camera casing and then attached to the camera casing in its proper position. The said unit 10 may include intermittent film advancing mechanism, shutter mechanism, lens mounting, film gate, aperture plate and film pressure pad.

The intermittent film advancing mechanism may be constructed as described in our co-pending application Serial No. 70,188, filed March 23, 1936, for Motion picture apparatus, which comprises a flat shuttle member 11 provided with a central aperture 12, and a pair of aligned slotted apertures 13 and 14. The shuttle 11 is designed to reciprocate in a straight line by having a pair of shaft members 15 provided at their lower ends with a screw threaded portion of reduced diameter which is threaded into the wall 16 of the frame comprising said unitary construction. It is noted that the wall 16 is parallel to the shuttle 11. The upper end of the shafts 15 pass through the slots 13 and 14 and are provided with enlarged heads 17 to prevent the said upper shaft ends from moving out of the slots 13 and 14. Spacer members 18 surrounding the shafts 15 are provided between the shuttle 11 and a second shuttle 50 soon to be described in greater detail, said shuttle 50 being in turn spaced from the wall 16 by bosses 19 to maintain the shuttles 11 and 50 at a constant distance from the said wall 16 at all times.

To cause the shuttle 11 to reciprocate, there is provided a cam 20 mounted on the squared portion 21 of the shaft 22. The cam 20 is designed to operate in the aperture 12 in such a manner that upon rotation of the shaft 22, the shuttle 11 will be caused to reciprocate in a straight line path. The shaft 22 is provided with a pinion 23 which is adapted to cooperate with a suitable spring motor driving mechanism not shown in the drawing, but which may be of the type fully described in our co-pending application, Serial No. 135,410, filed April 7, 1937, for Motion picture camera. The pinion 23 may be made integral with the shaft 22 to prevent slipping or disalignment to disturb the proper timing of the mechanism. Mounted on a flat side of the shuttle 11 for rotation about a pivot 24 which is at right angles to the plane of said shuttle 11, is a film dog 25 provided with a tooth portion 25a designed to engage in the uniformly spaced perforations P in the film F.

The function of this film dog tooth 25a is to engage in the perforation P of the film F on the downward stroke of the shuttle 11 to thereby move or advance the film a predetermined distance, and on the upward stroke of said shuttle 11 to become disengaged from said perforation and to ride upwardly on the back of the portion of the film between perforations until it will become engaged in another perforation so that it may be in readiness to again advance the film on the next downward stroke of the shuttle 11. To more effectively accomplish this function of the tooth 25a, we have provided the following construction: A spring, such as for example the coil spring 26 which is preferably of light construction, is provided to normally urge the tooth 25a toward the film F so that it may readily engage in the perforations P. One end of the spring 26 is fixed to the shuttle 11 by any suitable attaching means such as an end loop thereof engaging a hook member 27, which may be integral with and at right angles to the flat side of the shuttle 11, while a loop at the other end of said spring 27 is engaged in an aperture 28 in the film dog 25, disposed to the right of the pivot 24. It is noted that the end loops of the spring 27 are at right angles to each other. It is thus seen that the spring 26 will urge the film dog 25 to rotate in a clockwise direction to cause the tooth 25a to move toward the film.

By reason of the use of a light spring 26, the tooth 25a will not strike too severe a blow to the upper edge of the perforation P upon leaving said perforation, and will not bear too heavily against the back surface of the film during the upward stroke of the shuttle 11. In view of the use of the light spring 26, it is desirable to provide some additional means to limit the rotation of the dog 25 during the downward stroke of the shuttle, so that the tooth 25a may have a firm grip in the perforation P. We have provided, therefore, an abutment member 29 on the shuttle 11 disposed in the path of an extended arm 25b of the dog 25, so that during the downward stroke of the shuttle 11, the arm 25b will abut the member 29, to maintain the dog 25 rigid while it advances the film. On the upward stroke of the shuttle 11, the arm 25b will be free to move away from the abutment 29 against the action of the light spring 26. The said abutment 29 may comprise a struck-up portion of the shuttle 11.

In motion picture cameras of the type herein described, it is of extreme importance that the movement or advancement of the film be at all times in proper synchronization with the uncovering and covering of the film aperture by the shutter. By our invention, therefore, we have provided an improved construction by means of which the film advancing mechanism and the shutter operating mechanism are driven from the same shaft so that, once properly adjusted, they will always maintain proper synchronism.

The shutter 31 is designed to intermittently cover the film aperture 32 disposed in the wall 33 which is integral with and at right angles to the wall 16. As shown in the drawing, the shutter 31 may be integral with the shuttle 50 and may be formed by bending a side portion 50a adjacent one end of the flat shuttle 50 at right angles thereto and parallel to the wall 33. It is understood, of course, that the shutter 31 may be attached to the shuttle 50 for reciprocation therewith by any other desired known means of attachment. The shutter 31 is adapted to be reciprocated in a straight line path by means of the shuttle 50, which is similar in construction to the shuttle 11.

A cam 34 is mounted on the squared shaft portion 21 properly spaced from the cam 20 by a spacer 35, and is adapted to operate in an opening 36 and to be guided in straight line reciprocation by a pair of aligned slots 37 and 38, similar to the slots 13 and 14. Passing through the slots 37 and 38 are the shafts 15. The shuttles 11 and 50 are held against displacement by the spacer members 18 and the bosses 19, as hereinbefore described. It is thus seen from the foregoing description that when the shaft 22 is rotated, the cams 20 and 34 will cause the shuttles 11 and 50 to reciprocate in a straight line path in synchronism, to cause the film dog 25 to intermittently advance the film, and the shutter, to cover and uncover the film aperture 32 in properly timed relationship. Because of the fact that both the film feeding device and the shutter are driven from the same shaft, there will be no possibility of lost motion to destroy the proper timing relationship between said film feed and said shutter, which will therefore always remain constant.

In addition to the above described novel assembly of our film feeding and shutter mechanism on a unitary support 10, we have also provided a film passageway and gate construction carried by the same assembly which will now be described.

The wall 33 in which is disposed the film aperture 32 is provided with a recessed area 33a as clearly shown in Figs. 3, 4 and 6. Into this area 33a there is disposed the film gate 40. To form a film passageway between the inner surface of the film gate 40 and the recess 33a, the said film gate is held spaced from the recess by means of a slightly raised portion 33d adjacent to and above the recessed area 33a, and into which there is received an extended portion 40a of the film gate. (See Figs. 4 and 6.) The above described construction is so designed that when the film gate portion 40a contacts the recess 33d, the film gate 40 will be spaced from the recess 33a a distance sufficient to provide a passageway for the film F, such distance being approximately one tenth of an inch.

The film gate 40 is hingedly mounted on a shaft 44 (see Fig. 4), which in turn is freely disposed in the recessed bearing grooves 46 disposed on the underside of the wall 43. The film gate 40 may be held in normal effective position by a coil spring 47, having one extended end 47a thereof pressing against the wall 43 (see Fig. 3) and the other extended end 47b thereof being disposed at right angles to the end 47a and adapted to press against the back of the film gate 40, to maintain the extended portion 40a in contact with the recess 33d. It is noted that the wall 43 is integral with the wall 33 and also parallel to and integral with the wall 16.

To facilitate the opening of the film gate 40 against the action of the spring 47, there is provided a tab extension 48, as shown in Figs. 4 and 6. The wall 33 is provided with a slotted aperture 51, through which the tooth portion 25a of the film dog 25 is adapted to project, in order to engage the perforations P in the film F. To insure that the point of the tooth 25a will always firmly grip the bottom edge of the perforation P when traveling in a downward direction to advance the film, the film gate 40 is provided with a recessed area 52 (see Fig. 1) of sufficient length to accommodate the stroke of the film dog 25. It is thus seen that the tip of the film dog tooth 25a will project through and slightly beyond the perforation P in the film to insure a firm grip. The said recessed area 52 may be formed by pressing out a portion of the material of the film gate 40 from the inside surface thereof.

Another novel feature of our unitary assembly lies in the incorporation into the single piece die cast frame, comprising the walls 16, 43 and 33, of integral means for mounting the lens, including a lens seat. As shown in Figs. 1 and 3 of the drawing, there is provided integral with and at right angles to the wall 33, a wall 53 and an integral wall 54 extending downwardly from the wall 53 and parallel to and spaced from the wall 33. The wall 54 is provided with an aperture 55 in alignment with the film aperture 32. Into the aperture 55 there is received a bushing member 56 provided with an internal threaded aperture 57 in alignment with the film aperture 32. The bushing 56 is provided with externally screw threaded portion 58 adapted to have screwed thereto a lens L of standard construction. The outer surface 54a of the wall 54 is finished off accurately to serve as a seat for the lens. It is thus seen from the above described relatively simple construction that the distance from the lens seat 54a to the film surface will always remain constant and, therefore, errors of alignment and focus due to movement of the parts will be prevented.

To insure the proper positioning of the film F as it passes the film aperture 32, and to prevent movement of the film F during the upward stroke of film dog 25, we have provided an improved pressure pad construction mounted on the film gate 40, shown in Figs. 3, 4 and 5, and which will now be described. The film gate 40 is provided with a through opening 60, which may be rectangular as shown, or which may be of any other desired shape. Into the opening 60 there is placed a correspondingly shaped press pad 61, having a smooth surface 61a which is adapted to contact the film F. The pad 61 is provided with flanged walls 61b, which are of greater height than the thickness of the wall of the film gate 40, to permit a predetermined amount of free movement of the pad 61 toward and away from the film F. The flanges of the walls 61b serve to limit the movement of the pad 61 toward the film. The press pad 61 is made to resiliently contact the film F by means of a coil spring 65, one end of which is adapted to press against the pad 61, and the other end thereof is held by a cover member 66. To prevent disalignment of the spring 65, the cover member 66 may be provided with a pressed out bulging portion 67 designed to hold the end of the spring 65 properly centered. It is seen from the above described construction that we have provided improved means for applying constant pressure against the film as it passes the film aperture 32, and that when the film tooth 25a rides upwardly on the back of the film it will not cause displacement of the framing of the film with respect to the aperture 32.

Suitable means, such as apertures 70, are provided in the walls 16 and 43 of the unitary die cast frame for attaching the same to the camera casing.

The wall 33 is provided with stepped shoulder portions 33b and 33c, which serve as a light seal in cooperation with the camera casing, not shown in the drawing, but which is fully described in our co-pending application, Serial No. 128,728, filed March 3, 1937, for Motion picture camera.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. In a motion picture camera of the character described, intermittent film advancing means comprising a reciprocating shuttle, means for causing said shuttle to reciprocate, a reciprocating shutter, means for causing said shutter to reciprocate, a film gate, lens mounting means, and a one piece support for said film advancing means, said shuttle operating means, said shutter, said shutter operating means, said film gate and said lens mounting means, said support being designed so as to be removably mounted within said camera.

2. In a motion picture camera of the character described, intermittent film advancing means comprising a reciprocating shuttle, means for causing said shuttle to reciprocate, a reciprocating shutter, means for causing said shutter to reciprocate, a film gate, lens mounting means, and a one piece die cast support for said film advancing means, said shuttle operating means, said shutter, said shutter operating means, said film gate and said lens mounting means, said support comprising a pair of integral walls at right angles to each other, one of said walls being provided with apertures designed for use in removably mounting said support within said camera.

3. In a motion picture camera of the character described, the combination of an integral support comprising a first wall and a second wall at right angles to said first wall, a shaft rotatably mounted in said second wall, a first cam fixed to said shaft for rotation therewith, a second cam spaced from said first cam and fixed to said shaft for rotation therewith, said cams being rotatable in planes parallel to each other and to said second wall, a reciprocating shutter shuttle actuated directly by said first cam, a reciprocating film dog shuttle actuated directly by said second cam, means for causing said shuttles to move in a straight line, said last named means comprising projecting pins fixed to said second wall on opposite sides of said shaft and passing through slotted apertures in said shuttles, an opening in said first wall, a film aperture in said first wall spaced from said opening, a spring urged rotatably mounted film dog fixed to said film dog shuttle and having a portion thereof received in said opening for intermittently advancing a film, and a shutter mounted on said shutter shuttle for movement therewith to intermittently cover and uncover said film aperture.

4. In a motion picture camera of the character described, the combination of an integral support comprising a first wall and a second wall at right angles to said first wall, a shaft rotatably mounted in said second wall, a first cam fixed to said shaft for rotation therewith, a second cam spaced from said first cam and fixed to said shaft for rotation therewith, said cams being rotatable in planes parallel to each other and to said second wall, a reciprocating shutter shuttle actuated directly by said first cam, a reciprocating film dog shuttle actuated directly by said second cam, each of said shuttles having slotted apertures, the slotted apertures of one shuttle being in axial alignment with the slotted apertures of the other of said shuttles, means for causing said shuttles to move in a straight line, said last named means comprising projecting pins threadedly fixed to said second wall on opposite sides of said shaft and passing through said slotted apertures in said shuttles, an opening in said first wall, a film aperture in said first wall spaced from said opening, a spring urged rotatably mounted film dog fixed to said film dog shuttle and having a portion thereof received in said opening for intermittently advancing a film, and a shutter mounted on said shutter shuttle for movement therewith to intermittently cover and uncover said film aperture.

5. In a motion picture camera of the character described, the combination of an integral support comprising a first wall and a second wall at right angles to said first wall, a shaft rotatably mounted in said second wall, a first cam fixed to said shaft for rotation therewith, a second cam spaced from said first cam and fixed to said shaft for rotation therewith, said cams being rotatable in planes parallel to each other and to said second wall, a reciprocating shutter shuttle actuated directly by said first cam, a reciprocating film dog shuttle actuated directly by said second cam, means for causing said shuttles to move in a straight line, said last named means comprising projecting pins fixed to said second wall on opposite sides of said shaft and passing through slotted apertures in said shuttles, an opening in said first wall, a film aperture in said first wall spaced from said opening, a spring urged rotatably mounted film dog fixed to said film dog shuttle and having a portion thereof received in said opening for intermittently advancing a film, a shutter mounted on said shutter shuttle for movement therewith to intermittently cover and uncover said film aperture, and means comprising spacer collars surrounding said pins and interposed between said shuttles to prevent displacement of said shuttles with respect to said cams.

6. In a motion picture camera of the character described, the combination of an integral support comprising a first wall and a second wall at right angles to said first wall, a shaft rotatably mounted in said second wall, a first cam fixed to said shaft for rotation therewith, a second cam spaced from said first cam and fixed to said shaft for rotation therewith, said cams being rotatable in planes parallel to each other and to said second wall, a reciprocating shutter shuttle actuated directly by said first cam, a reciprocating film dog shuttle actuated directly by said second cam, means for causing said shuttles to move in a straight line, said last named means comprising projecting pins fixed to said second wall on opposite sides of said shaft and passing through slotted apertures in said shuttles, an opening in said first wall, a film aperture in said first wall spaced from said opening, a spring urged rotatably mounted film dog fixed to said film dog shuttle and having a portion thereof received in said opening for intermittently advancing a film, said shutter having an integral portion thereof extending therefrom so as to intermittently cover and uncover said film aperture.

7. In a motion picture camera of the character described, the combination of an integral support comprising a first wall and a second wall at right angles to said first wall, a shaft rotatably mounted in said second wall, a first cam fixed to said shaft for rotation therewith, a second cam spaced from said first cam and fixed to said shaft for rotation therewith, said cams being rotatable in planes parallel to each other and to said second wall, a reciprocating shutter shuttle actuated directly by said first cam, a reciprocating film dog shuttle actuated directly by said second cam, means for causing said shuttles to move in a straight line, said last named means comprising projecting pins fixed to said second wall on opposite sides of said shaft and passing through slotted apertures in said shuttles, an opening in said first wall, a film aperture in said first wall spaced from said opening, a spring urged rotatably mounted film dog fixed to said film dog shuttle and having a portion thereof received in said opening for intermittently advancing a film, said last named extending portion being disposed in a plane parallel to and closely adjacent said first wall.

8. In a motion picture camera of the character described, the combination of an integral support comprising a first wall and a second wall at right angles to said first wall, a shaft rotatably mounted in said second wall, a first cam fixed to said shaft for rotation therewith, a second cam spaced from said first cam and fixed to said shaft for rotation therewith, said cams being rotatable in planes parallel to each other and to said second wall, a reciprocating shutter shuttle actuated directly by said first cam, a reciprocating film dog shuttle actuated directly by said second cam, means for causing said shuttles to move in a straight line, said last named means comprising projecting pins fixed to said second wall on opposite sides of said shaft and passing through slotted apertures in said shuttles, an opening in said first wall, a film aperture in said first wall spaced from said opening, a spring urged rotatably mounted film dog fixed to said film dog shuttle and having a portion thereof received in said opening for intermittently advancing a film, a shutter mounted on said shutter shuttle for movement therewith to intermittently cover and uncover said film aperture, and apertured flange portions on one of said walls for removably mounting said support in said camera.

9. In a motion picture camera of the character described, the combination of an integral support comprising a first wall and a second wall at right angles to said first wall, a shaft rotatably mounted in said second wall, a first cam fixed to said shaft for rotation therewith, a second cam spaced from said first cam and fixed to said shaft for rotation therewith, said cams being rotatable in planes parallel to each other and to said second wall, a reciprocating shutter shuttle actuated directly by said first cam, a reciprocating film dog shuttle actuated directlty by said second cam, means for causing said shuttles to move in a straight line, said last named means comprising projecting pins fixed to said second wall on opposite sides of said shaft and passing through slotted apertures in said shuttles, an opening in said first wall, a film aperture in said first wall spaced from said opening, a spring urged rotatably mounted film dog fixed to said film dog shuttle and having a portion thereof received in said opening for intermittently advancing a film, and an abutment member on said film dog shuttle arranged so that said last named film dog portion will positively engage the film to move the same in one direction and will resiliently slide over the film in the opposite direction.

OTTO W. GITHENS.
GEORGE KENDE.
EVERETT M. PORTER.